US 12,454,987 B2

(12) United States Patent
Szafnauer et al.

(10) Patent No.: US 12,454,987 B2
(45) Date of Patent: Oct. 28, 2025

(54) BRAKE ASSEMBLY

(71) Applicant: Meritor Heavy Vehicle Braking Systems (UK) Limited, Cwmbran (GB)

(72) Inventors: Alex Szafnauer, Cwmbran (GB); Sean Cleary, Cwmbran (GB); Tim Smith, Cwmbran (GB); Anthony Williams, Cwmbran (GB); Paul Thomas, Cwmbran (GB)

(73) Assignee: Meritor Heavy Vehicle Braking Systems (UK) Limited (GB)

( * ) Notice: Subject to any disclaimer, the term of this patent is extended or adjusted under 35 U.S.C. 154(b) by 510 days.

(21) Appl. No.: 17/698,565

(22) Filed: Mar. 18, 2022

(65) Prior Publication Data

US 2022/0299075 A1    Sep. 22, 2022

(30) Foreign Application Priority Data

Mar. 22, 2021  (EP) .................................. 21164067

(51) Int. Cl.
*F16D 65/00*   (2006.01)
*F16D 55/227*  (2006.01)

(52) U.S. Cl.
CPC ....... *F16D 65/0006* (2013.01); *F16D 55/227* (2013.01); *F16D 65/005* (2013.01)

(58) Field of Classification Search
CPC .. F16D 65/0006; F16D 65/005; F16D 55/227; F16D 55/22655
See application file for complete search history.

(56) References Cited

U.S. PATENT DOCUMENTS

| 9,435,391 B2* | 9/2016 | Loew ................... F16D 65/0068 |
| 2014/0116817 A1* | 5/2014 | Morais ................. F16D 55/227 188/73.44 |
| 2022/0299079 A1* | 9/2022 | Szafnauer ............. F16D 65/095 |

FOREIGN PATENT DOCUMENTS

| DE | 27 22 620 A1 | 11/1978 | |
| DE | 41 19 928 A1 | 12/1992 | |
| DE | 10150214 A1 * | 4/2003 | ....... F16D 55/22655 |
| EP | 3 193 035 A1 | 7/2017 | |
| EP | 3 296 585 A1 | 3/2018 | |

OTHER PUBLICATIONS

Extended European Search Report dated Sep. 6, 2021 for related application No. 21164067.7; 7 pages.
European examination report dated Mar. 19, 2024 for related European Appln. No. 21164067.7; 4 pages.

* cited by examiner

Primary Examiner — Robert A. Siconolfi
(74) Attorney, Agent, or Firm — Dickinson Wright PLLC

(57) ABSTRACT

A brake assembly including a caliper that has a first guide bore, a brake carrier arranged to receive a brake pad, a first guide pin secured to the brake carrier, and a first lock arrangement. The first lock arrangement is operable to selectively inhibit relative sliding between the caliper and the brake carrier.

12 Claims, 14 Drawing Sheets

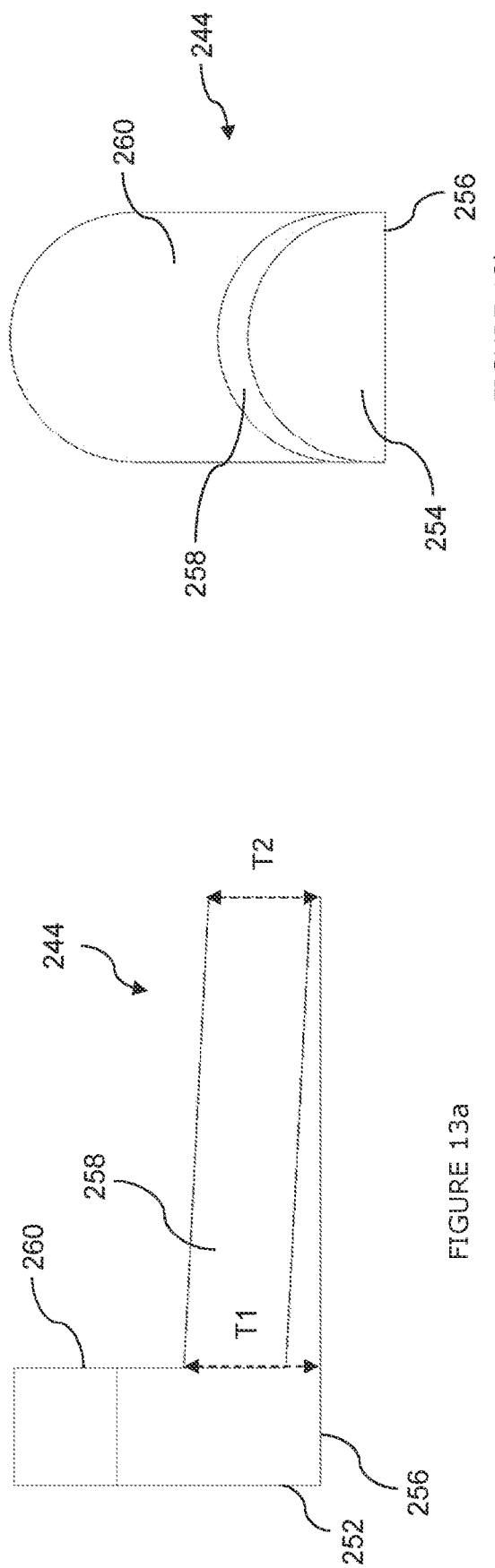
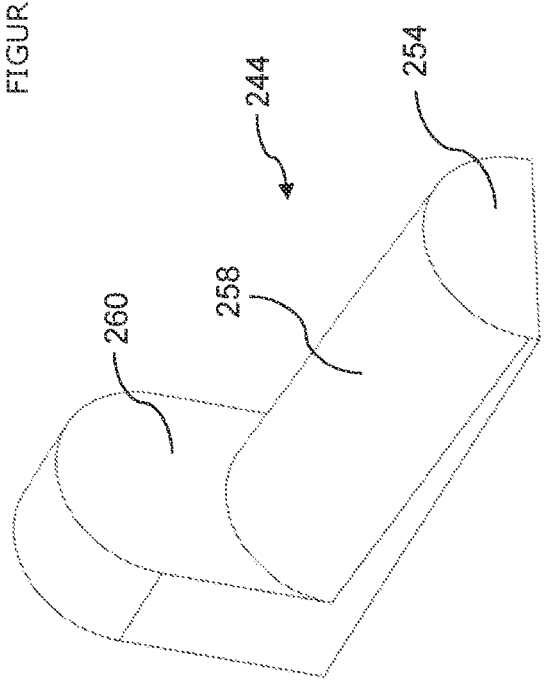
FIGURE 13a
FIGURE 13b
FIGURE 13c

BRAKE ASSEMBLY

TECHNICAL FIELD

The present teachings relate to a brake assembly for a heavy commercial vehicle.

BACKGROUND

Commonly, air-actuated heavy-vehicle disc brakes include a brake carrier, a brake caliper, an inboard brake pad and an outboard brake pad. In use, the brake carrier straddles a brake rotor and the brake pads are positioned on opposing sides of said brake rotor. Typically, the brake caliper is arranged to freely slide on guide pins relative to the brake carrier, and the brake pads are secured to the brake caliper. As such, during a braking operation, under the action of a brake actuator, the brake pads can move relative to the brake carrier, such that friction material on each brake pad contacts the brake rotor.

Outside of a braking operation, the brake actuator is released, and the brake pads are typically 'pushed' away from the rotor back to a rest position due to the rotor being slightly uneven or having a degree of runout. However, at least one of the brake pads may contact the brake rotor unintentionally. Such unintentional contact between the brake pads and the brake rotor may be caused by, for example, engine vibration or cornering forces. Contact between the brake rotor and the brake pads outside of a braking operation can lead to lower vehicle efficiency and higher fuel consumption, as well as reducing the life of the brake pads due to increased wear of the friction material.

Existing systems for positive pad retraction can help to ensure that the brake pads are pushed away from the rotor after a brake operation, but they are typically located in an intermediate position between the inboard and outboard brake pads so cannot account for differential brake pad and rotor wear, when the inboard and outboard brake pads, and opposite surfaces of the rotor, wear at different rates. Such positive pad retraction systems are also difficult to align and locate, due to, for example, machining tolerances.

The present teachings seek to overcome, or at least mitigate the problems of the prior art.

SUMMARY

According to a first aspect, there is provided a brake assembly for a heavy commercial vehicle. The brake assembly comprises: a caliper comprising a first guide bore, a brake carrier arranged to receive a brake pad, a first guide pin secured to the brake carrier, the first guide pin being received within the first guide bore of the caliper such that the caliper is slidable relative to the brake carrier, and a first lock arrangement at least partially located within the first guide bore. The first lock arrangement is operable to selectively inhibit relative sliding between the caliper and the brake carrier.

Advantageously, since the lock arrangement is operable to inhibit relative sliding between the caliper and the brake carrier, the lock arrangement may be used to stop the caliper sliding relative to the brake carrier outside of a braking operation when there is a desired running clearance between each brake pad and a brake rotor. As such, the lock arrangement can help to prevent the brake pads from contacting the brake rotor unintentionally.

Moreover, when the lock arrangement is operated to inhibit relative sliding between the caliper and the brake carrier, the lock arrangement may also act to dampen undesirable vibrational effects, such as a rattling sound caused by the guide pin abutting against the caliper due to engine vibration for example.

The first lock arrangement may be configured to be at least partially interposed between the first guide bore and the first guide pin.

This provides a compact design since the axial length of the guide pin and/or the guide bore does not necessarily need to be increased in order to accommodate the lock arrangement.

The first lock arrangement may be secured to either the caliper or the first guide pin. The first lock arrangement may be configured to increase a frictional force between the first lock arrangement and the other of the caliper or the first guide pin in a first state of the first lock arrangement relative to a second state of the first lock arrangement. In the first state, the first lock arrangement may inhibit relative sliding between the caliper and the brake carrier. In the second state, the caliper and the brake carrier may be free to slide relative to each other.

This provides a consistent, robust, and temporary means to inhibit relative sliding between the caliper and the brake carrier.

The first lock arrangement may comprise an expandable element at least partially interposed between the first guide bore and the first guide pin. In the first state, the expandable element may be in an expanded configuration. In the second state, the expandable element may be in a contracted configuration.

This provides a consistent, robust, and temporary means to inhibit relative sliding between the caliper and the brake carrier, which requires only one moving part, i.e., the expandable element required, within the guide bore.

The expandable element may be formed from a flexible material and comprise a cavity. The expandable element may be transformed between the contracted configuration and the expanded configuration via the introduction or removal of a gas or a liquid into said cavity.

This allows the expandable element to be consistently expanded and retracted by introducing/removing known quantities of gas or liquid into/from the cavity.

The brake assembly may further comprise an air actuator configured to move the brake pad relative to the caliper. The expandable element may be transformed from the contracted configuration to the expanded configuration via the introduction of a gas into the cavity. Said gas may be expelled from the air actuator and transported to the cavity via piping.

Advantageously, this negates the need for a separate and dedicated gas supply in order to expand the expandable element.

The expandable element may be formed from an elastic material configured to be in a stretched state in the expanded configuration and a retracted state in the contracted configuration.

Advantageously, this may limit the friction between the guide pin and the expandable element when the expandable element is in the contracted configuration.

The expandable element may be in the form of a sleeve arranged to surround the first guide pin.

This may help to increase the friction between the lock arrangement and the guide pin or the guide bore by increasing the contact surface area between the expandable element and the guide pin or the guide bore.

The expandable element may extend along at least a majority of an axial length of the first guide pin and/or the first guide bore.

This may help to increase the friction between the lock arrangement and the guide pin or the guide bore by increasing the contact surface area between the expandable element and the guide pin or the guide bore. Moreover, this allows the lock arrangement to operate over a greater relative range of movement between the caliper and the brake carrier.

The first lock arrangement may comprise a first moveable element at least partially interposed between the first guide bore and the first guide pin. The first lock arrangement may be configured to move the first moveable element between a first position and a second position along an axis substantially parallel to a longitudinal axis of the first guide pin. In the first state, the first moveable element may be in the first position. In the second state, the first moveable element may be in the second position.

This provides a consistent, robust, and temporary means to inhibit relative sliding between the caliper and the brake carrier, which requires only one moving part within the guide bore.

The first moveable element may have a substantially wedge-shaped profile.

Advantageously, this may allow the moveable element to increase and reduce the friction between the lock arrangement and the guide pin/guide bore gradually as the moveable element moves between the first and the second positions. This may reduce wear of the guide pin/guide bore caused by the moveable element.

The caliper may comprise a cap arranged to close an opening of the first guide bore. The first lock arrangement may comprise an actuator secured to the cap which is operable to move the first moveable element relative to the caliper between the first position and the second position.

This may allow one or more components of the lock arrangement to be easily accessed for inspection and replacement.

The actuator may be an electric linear actuator.

The caliper may comprise a bush interposed between the first guide bore and the first guide pin. The first moveable element may be at least partially interposed between the bush and the first guide pin.

This helps to limit wear of the components within the guide bore.

The bush may comprise a channel arranged such that the first moveable element is at least partially received within said channel.

This helps to provide a more compact design.

The channel may have a profile which corresponds substantially to a profile of the first moveable element.

The first lock arrangement may comprise a second moveable element at least partially interposed between the first guide bore and the first guide pin. The second moveable element may be spaced from the first moveable element. The first lock arrangement may be configured to move the second moveable element between a first position and a second position along an axis substantially parallel to the longitudinal axis of the first guide pin. In the first state, the second moveable element may be in the first position. In the second state, the second moveable element may be in the second position.

The brake assembly may further comprise a second guide pin secured to the brake carrier. The caliper may comprise a second guide bore, the second guide pin being received within the second guide bore of the caliper. The brake assembly may further comprise a second lock arrangement at least partially located within the second guide bore. The second lock arrangement may be operable to inhibit relative sliding between the caliper and the brake carrier.

According to a second aspect, there is provided a method for inhibiting relative sliding between the caliper and the brake carrier of the brake assembly according to the first aspect. The method comprises the steps of operating the first lock arrangement to inhibit relative sliding between the caliper and the brake carrier.

The method step of operating the first lock arrangement may include: increasing a friction force between the first lock arrangement and either the brake caliper or the first guide pin until relative sliding between the caliper and the brake carrier is inhibited.

BRIEF DESCRIPTION OF THE DRAWINGS

Embodiments are now disclosed by way of example only with reference to the drawings, in which:

FIG. 13a is a side profile view of the moveable element of the second embodiment;

FIG. 13b is a front profile view of the moveable element of the second embodiment;

FIG. 13c is an isometric view of the moveable element of the second embodiment;

DETAILED DESCRIPTION

Figure 1:
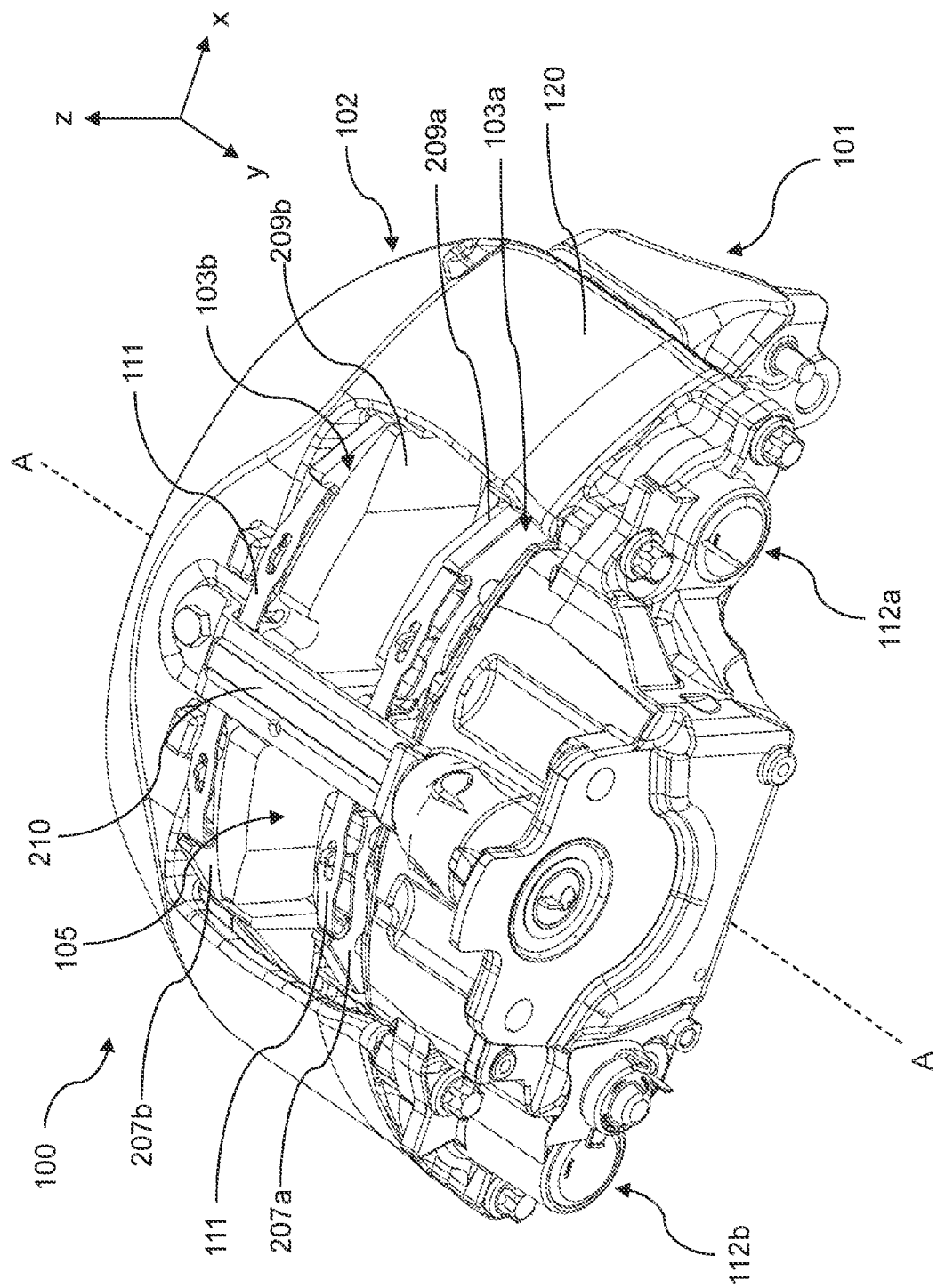
FIG. 1 is an upper isometric view of a brake assembly according to a first embodiment.
Figure 2:
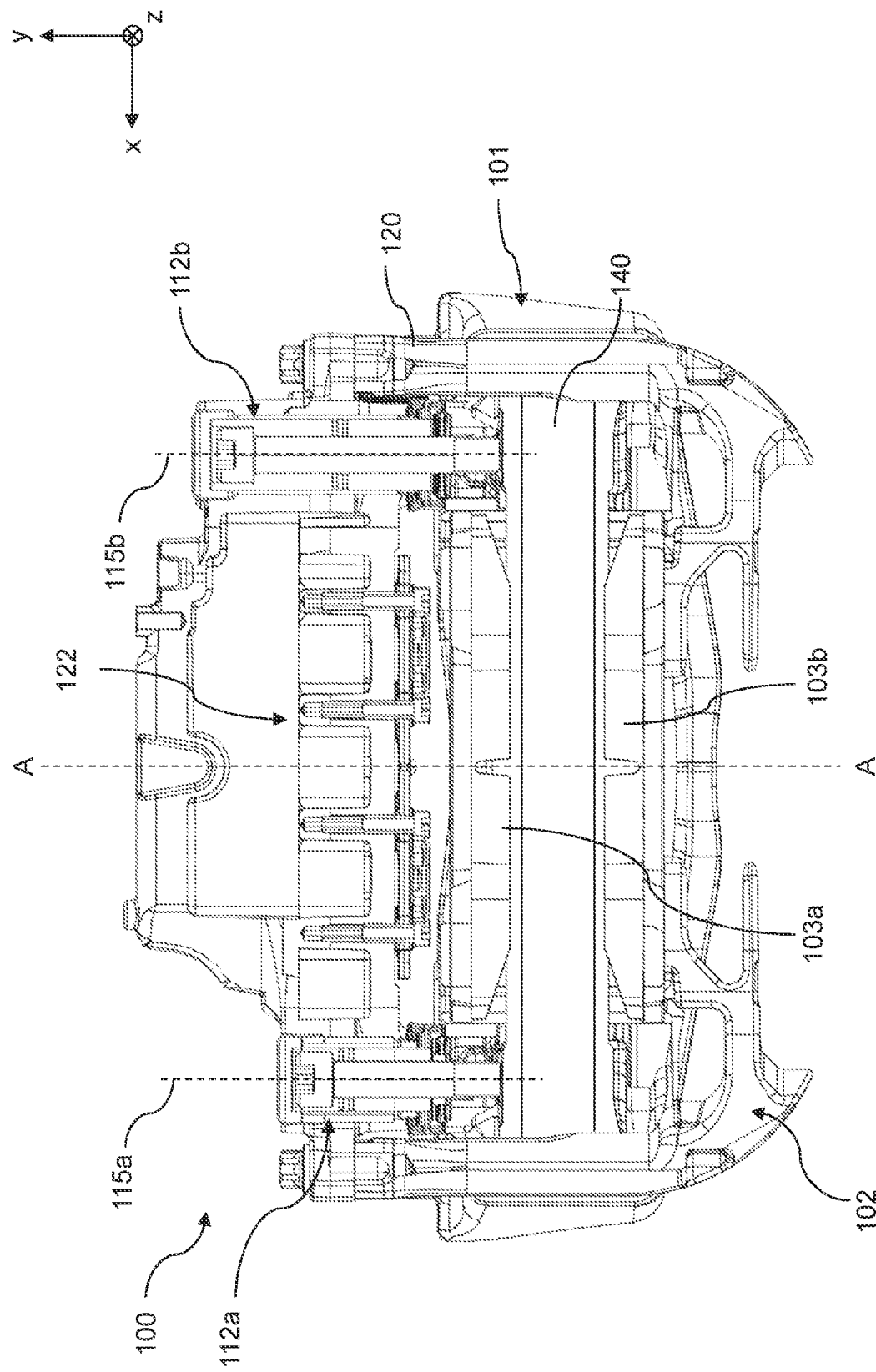
FIG. 2 is a cross-sectional view of the brake assembly of FIG. 1 in the x-y plane.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIGS. 1 to 7 show a disc brake assembly 100 for a heavy commercial vehicle according to a first embodiment. The disc brake assembly 100 includes a caliper 102 slidably mounted with respect to a brake carrier 101 by two guide assemblies 112a and 112b. The caliper 102 has a housing 120 typically formed from cast iron or steel. The carrier 101 is typically also formed from cast iron or steel.

The brake carrier 101 carries an inboard brake pad 103a and an outboard brake pad 103b.

A rotor 140 (see FIG. 2), rotatable about an axis extending in an axial direction A-A, is rotationally fixed relative to a hub of a wheel of the vehicle (not shown) and positioned between the brake pads 103a, 103b. An air actuator (not shown) is provided to move the inboard brake pad 103a into frictional contact with the rotor 140 via an actuation mechanism 122 (see FIG. 2) housed within the caliper housing 120 and which acts on the inboard brake pad 103a.

In alternative embodiments (not shown), the brake carrier 101 may only receive one of the inboard brake pad 103a or the outboard brake pad 103b. For example, the outboard brake pad 103b may be received in the caliper 102.

The inboard brake pad 103a includes a backplate 207a that supports friction material 209a which is mounted to the backplate 207a. The outboard brake pad 103b includes a backplate 207b that supports friction material 209b which is mounted to the backplate 207b.

During a braking operation, when the inboard brake pad 103a is pushed towards and contacts the rotor 140, the caliper 102 is then caused to slide inboard along first and second caliper guide assemblies 112a and 112b.

As the caliper 102 slides inboard, it moves the outboard brake pad 103b towards the rotor 140. Hence, the rotor 140 becomes clamped between the inboard and outboard brake pads 103a, 103b and the rotation of the rotor 140 is frictionally inhibited.

The caliper 102 defines an aperture 105 arranged to receive the brake carrier 101 and the brake pads 103a, 103b as shown in FIG. 1. Advantageously, the aperture 105 enables the inboard brake pad 103a and the outboard brake pad 103b to be installed and removed in a radial direction, with the rotor 140 in place.

During a braking operation, it is desirable for the inboard brake pad 103a and the outboard brake pad 103b to be located equidistant from the rotor 140, to help ensure that the inboard brake pad 103a and the outboard brake pad 103b and both sides of the rotor 140 wear as evenly as possible over the life of the disc brake assembly 100.

As the friction material 209a of the inboard brake pad 103a, the friction material 209b of the outboard brake pad 103b and the rotor 140 wear over the life of the disc brake assembly 100, an adjustment mechanism (well-known and not described in detail) is configured to advance the inboard brake pad 103a towards the rotor 140 during a braking operation if the clearance between the inboard brake pad 103a and the rotor 140 is greater than desired. The adjustment occurs until the friction material 209a of the inboard brake pad 103a contacts the surface of the rotor 140, at which point the adjustment is stopped.

When the disc brake assembly 100 is released at the end of the braking operation, the inboard brake pad 103a and the outboard brake pad 103b move away from the rotor 140, such that there is an inboard pad clearance and an outboard pad clearance.

As will be described in more detail below, in this embodiment, the disc brake assembly 100 includes a lock arrangement 142 which helps to maintain the inboard pad clearance and the outboard pad clearance outside of a braking operation by inhibiting relative movement between the caliper 102 and the brake carrier 101, which inhibits relative movement between the inboard brake pad 103a, the outboard brake pad 103b and the rotor 140.

A pad strap 210 is arranged to extend over the aperture 105 in the axial direction (i.e., in a direction parallel to axis A-A) to help retain the inboard brake pad 103a and the outboard brake pad 103b, but other known retention arrangements may be used. In this embodiment, the pad strap 210 is fixed to the housing 120 at the inboard side of the disc brake assembly 100 and can be bolted to the caliper 102 at the outboard side of the disc brake assembly 100 to retain the inboard brake pad 103a and the outboard brake pad 103b. Due to the aperture 105, the inboard brake pad 103a and the outboard brake pad 103b can be assembled in the disc brake assembly 100 in a radial direction relative to the rotor 140. For example, this enables the inboard brake pad 103a and the outboard brake pad 103b to be removed and replaced when fully worn without the disc brake assembly 100 being disassembled and/or the rotor 140 being removed.

The inboard brake pad 103a further comprises a pad spring 111 arranged between the backplate 207a of the inboard brake pad 103a and the pad strap 210. Specifically, the backplate 207a of the inboard brake pad 103a includes radially extending projections that engage corresponding recesses in the pad spring 111.

The outboard brake pad 103b further comprises a pad spring 111 arranged between the backplate 207b of the outboard brake pad 103b and the pad strap 110. The backplate 207b of the outboard brake pad 103b includes radially extending projections that engage corresponding recesses in the pad spring 111.

The pad springs 111 act to help bias the inboard brake pad 103a and the outboard brake pad 103b in the radial inward direction and help to dampen their movement, to help prevent rattling of the components in use. In other embodiments, other known biasing arrangements may be utilized.

The second guide assembly 112b is a conventional guide assembly known in the art. It can be seen in FIG. 2 that the second guide assembly 112b is longer than the first guide assembly 112a.

Figure 3:
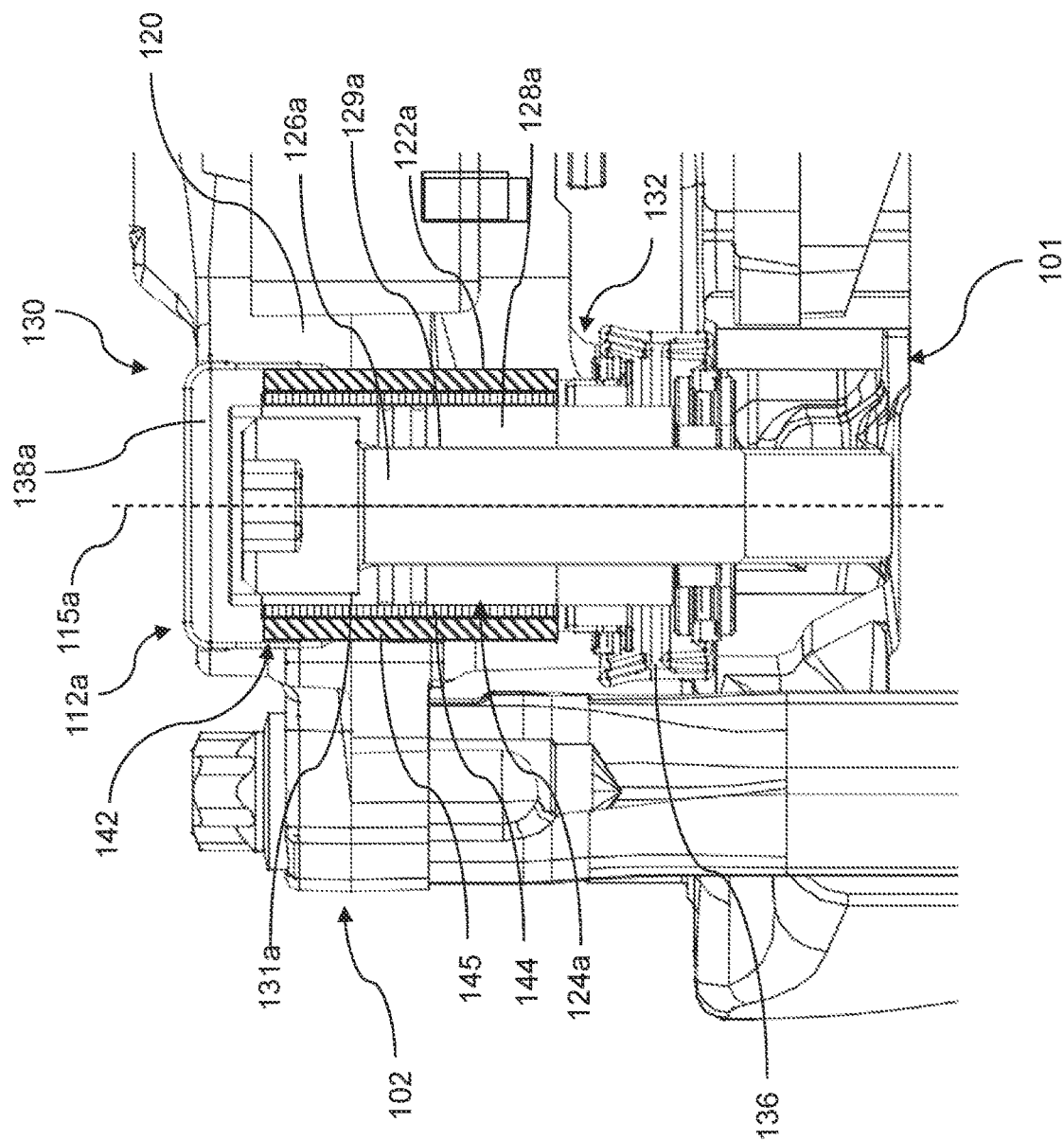
FIG. 3 is a magnified view of FIG. 2 showing the first guide assembly.
Figure 4:
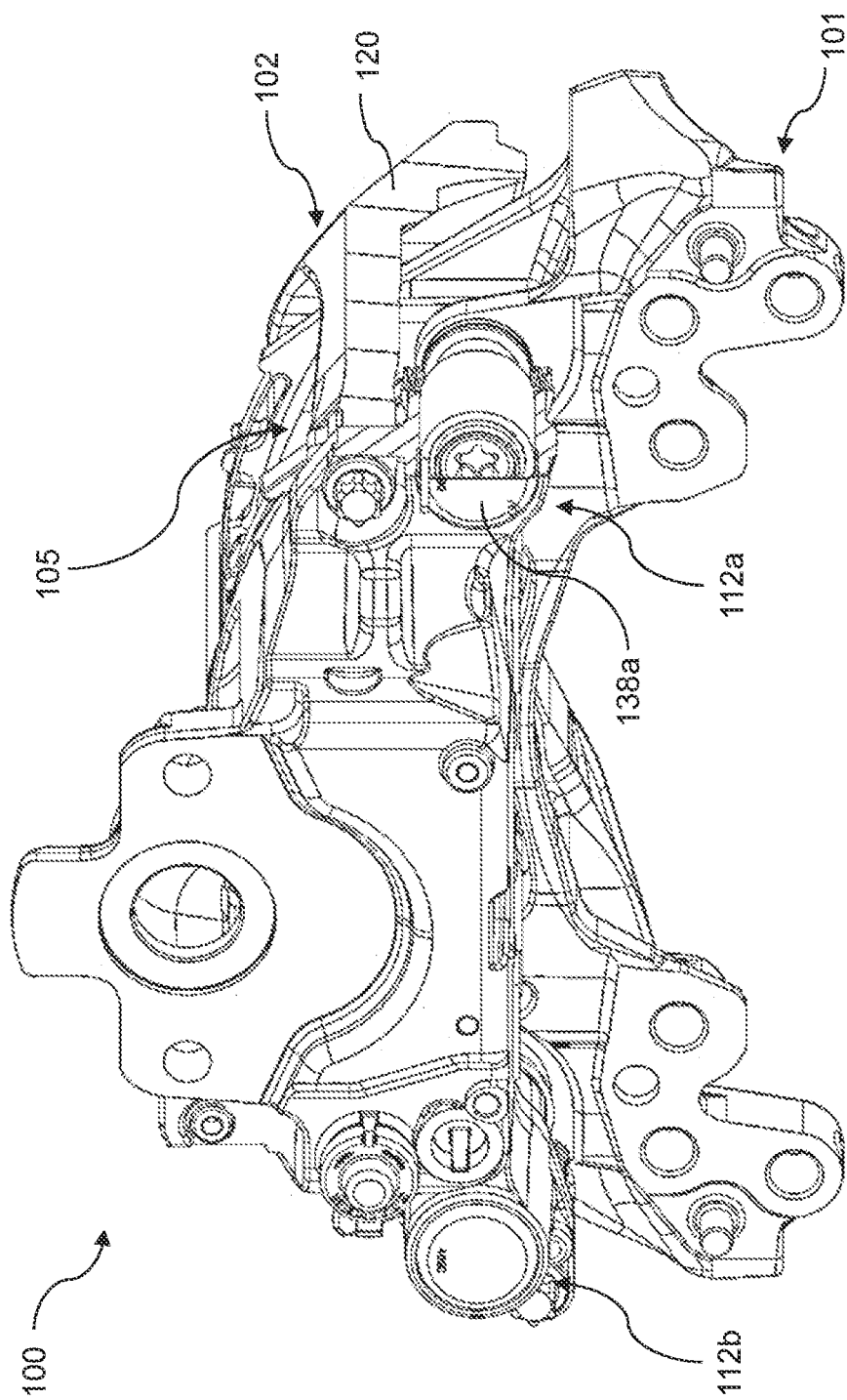
FIG. 4 is a lower isometric view of the brake assembly of FIG. 1 with a portion of the caliper removed to show the first guide assembly.
Figure 5:
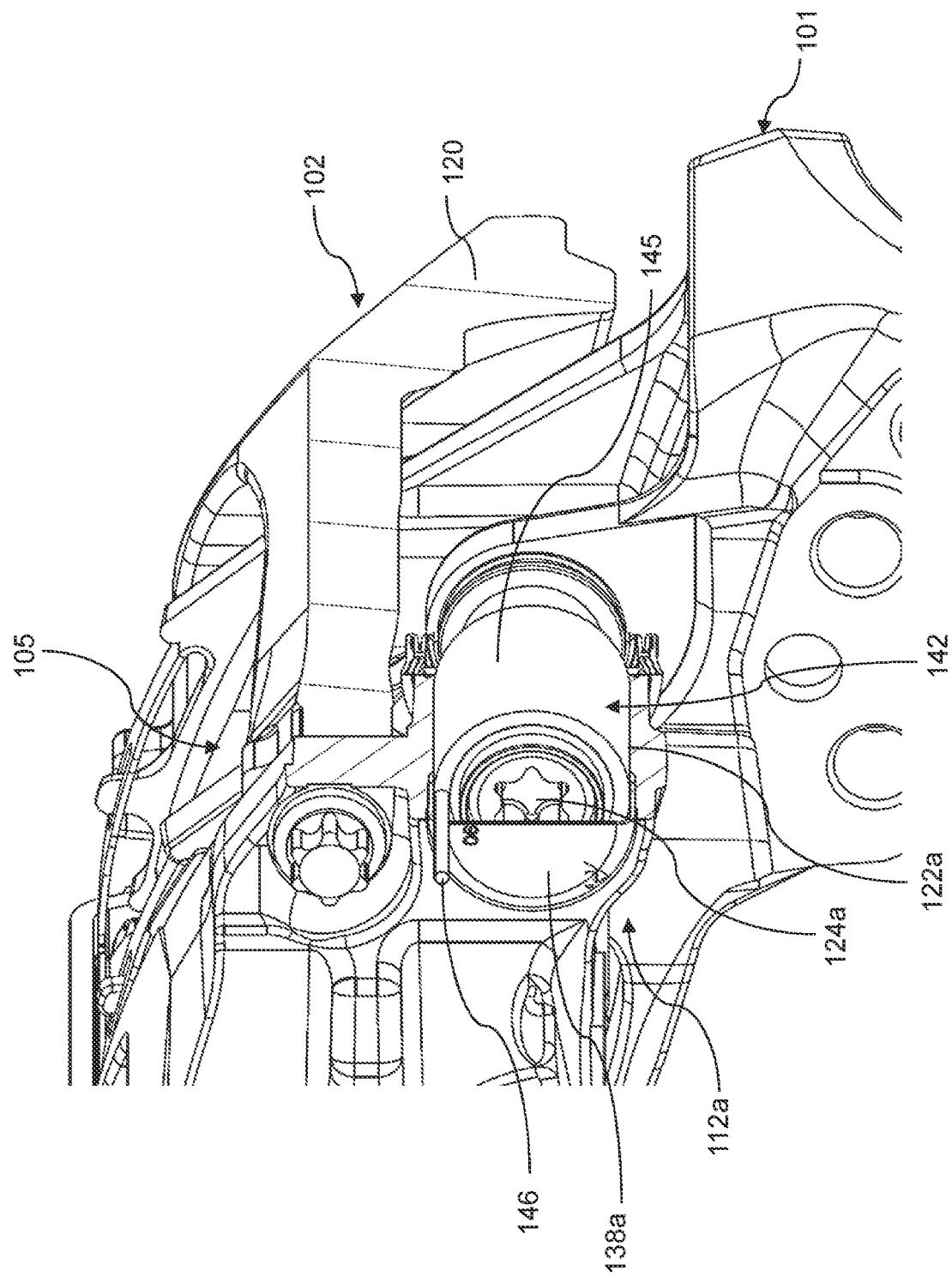
FIG. 5 is a magnified view of FIG. 4 showing the first guide assembly.

With reference to FIG. 3, the first guide assembly 112a comprises a bore 122a extending through the caliper housing 120 along an axis 115a, which is parallel to axis A-A. Hereinafter, any direction which is parallel to axis A-A shall be referred to as the axial direction. The bore 122a has a circular cross-sectional profile and receives a guide pin 124a with a circular outer profile.

The guide pin 124a comprises a fastener 126a to secure the guide pin 124a to the brake carrier 101. In the illustrated embodiment, the fastener 126a is a bolt that affixes to the brake carrier 101 by screwing into a threaded bore in the brake carrier 101.

The guide pin 124a further comprises a guide sleeve 128a substantially surrounding the fastener 126a. The sleeve 128a is a hollow tube with a substantially circular cross-sectional profile. The sleeve 128a includes a central bore 129a within which the fastener 126a is received. A head portion 131a of the central bore 129a is stepped so that the fastener 126a is able to hold the sleeve 128a in place when tightened on to the carrier 101.

The bore 122a of the first guide assembly 112a is an elongate hole extending from a first (inboard) side 130 to a second (outboard) side 132 of the caliper housing 120. The caliper 102 is slidably mounted with respect to the brake carrier 101 by sliding the guide pin 124a through the bore 122a. Hence, when the disc brake is actuated, the caliper 102 is able to slide in the axial direction A-A along the guide pin 124a.

A convoluted bellows-type seal 136 encircles the guide pin 124a and connects to the carrier 101 and caliper 102 to protect the guide assembly 112a from contamination.

In order to further inhibit the contamination of the caliper guide assembly 112a with foreign matter, a cap or cover 138a, which is arranged to close an opening of the guide bore 122a, is secured to the inboard end of the bore 122a. The cap 138a is formed from metal and press fitted into the end of the bore 122a. However, in alternative embodiments (not shown), the cap 138a may be partially or wholly formed from a different material such as a plastics material for example.

As shown in FIGS. 3 to 7, a lock arrangement 142 is located within the bore 122a. The lock arrangement 142 is operable to inhibit relative sliding between the caliper 102 and the brake carrier 101.

As will become apparent below, the lock arrangement 142 may be used to inhibit relative sliding between the caliper 102 and the carrier 101 once the inboard brake pad 103a and the outboard brake pad 103b are spaced from the rotor 140. Preferably, the lock arrangement 142 may be used to inhibit relative sliding between the caliper 102 and the carrier 101 once the inboard brake pad 103a and the outboard brake pad 103b are located equidistant from the rotor 140.

The lock arrangement 142 includes a bush 145 (represented via diagonal hatchings in FIG. 3) and an expandable element 144 (represented via horizontal hatchings in FIG. 3). The expandable element 144 is in the form of a sleeve, which is arranged to surround the guide pin 124a.

In the illustrated embodiment, the bush 145 is formed from a brass material. However, in alternative embodiments (not shown), the bush 145 may be formed from any suitable material, such as a plastics or ceramics material for example.

The bush 145 is a hollow tube with a substantially circular cross-sectional profile. The bush 145 is secured to the bore 122a such that the bush 145 is fixed relative to the bore 122a. To achieve this, the bush 145 may be secured to the surface of the caliper housing 120 defining the bore 122a via an interference fit and/or one or more mechanical fasteners. Additionally or alternatively, the bush 145 may be welded or bonded to a surface of the caliper housing 120 defining the bore 122a.

The expandable element 144 is secured to the bush 145 via bonding. Alternatively or additionally, the expandable element 144 may be secured to the bush 145 via one or more mechanical fasteners, such as clips.

The expandable element 144 is formed from a flexible material such as rubber or a flexible plastics material.

The expandable element 144 includes an internal cavity (not shown). The internal cavity is in fluid communication with a pipe 146 which is secured to and extends from the bush 145. The pipe 146 and the internal cavity are arranged such that a liquid and/or a gas can be introduced into the cavity or removed from the cavity via the pipe 146.

The bush 145 includes a bore (not shown) which is in fluid communication with the pipe 146. The bore is in fluid communication with the cavity in the expandable element 144 via a port (not shown) in the expandable element 144. The port is located centrally in the expandable element 144 along the axial direction.

A liquid and/or a gas entering the bush 145 via the pipe 146 travels along the bore in the bush 145 and into the cavity of the expandable element 144 via the port. It will be appreciated that a fluid and/or a gas leaving the cavity in the expandable element 144 will travel along an opposite path.

In alternative embodiments (not shown), the pipe 146 may be in fluid communication with two or more bores in the bush 145, said bores in fluid communication with two or more ports in the expandable element 144.

When a liquid and/or a gas are/is introduced into the cavity via the pipe 146, the expandable element 144 expands from a low-volume contracted configuration to a high-volume expanded configuration. When the liquid and/or the gas are/is subsequently removed from the cavity via the pipe 146, the expandable element 144 contracts from the expanded configuration to the contracted configuration as the volume of the expandable element 144 decreases.

In the illustrated embodiment, the expandable element 144 is expanded from the contracted configuration to the expanded configuration via the introduction of a gas into the internal cavity. Said gas is expelled from the air actuator (not shown) under pressure and transported to the cavity via the pipe 146.

In alternative embodiments (not shown), the expandable element 144 may be expanded from the contracted configuration to the expanded configuration via the introduction of a gas and/or a liquid transported to the cavity via the pipe 146 under pressure from a pump, such as an air compressor and/or a hydraulic pump for example. In such embodiments, the gas and/or liquid may be pumped from gas and/or liquid reservoirs in the disc brake assembly 100 or in the vehicle.

The pipe 146 is in fluid communication with a valve (not shown). The valve can be changed between a first configuration and a second configuration. In the first configuration, the valve allows gas expelled from the air actuator (not shown) to enter the cavity in the expandable element 144, to expand the expandable element 144 from the contracted configuration to the expanded configuration. In the second configuration, the valve allows gas within the cavity in the expandable element 144 to leave the cavity in the expandable element 144 to contract the expandable element 144 from the expanded configuration to the contracted configuration. In the second configuration of the valve, the pipe 146 may be in fluid communication with atmospheric pressure or a vacuum source.

Figure 6:
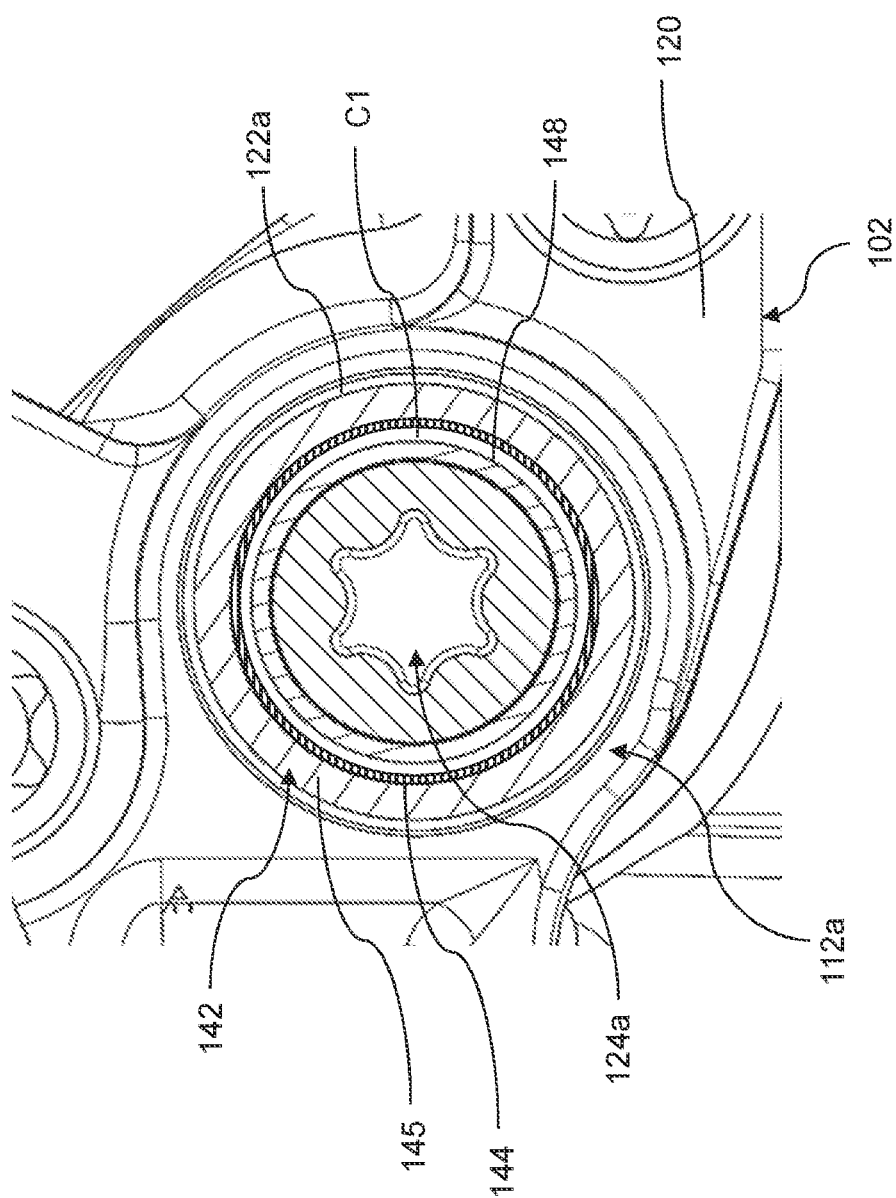
FIG. 6 is a partial cross-sectional view of the first guide assembly according to the first embodiment with the expandable element in a contracted configuration.

In this embodiment, the flexible material that the expandable element 144 is formed from is also elastic. The expandable element 144 is configured such that said elastic material is in a stretched state in the expanded configuration and a retracted state in the contracted configuration. FIG. 6 shows the expandable element 144 in the contracted configuration. When the expandable element 144 is in the contracted configuration, a clearance C1 exists between the expandable element 144 and an outer surface 148 of the guide pin 124a. The clearance C1 is sufficient to allow the guide pin 124a to slide freely relative to the expandable element 144, and hence the caliper 102 to slide freely relative to the brake carrier 101. In the contracted configuration, the volume of liquid and/or gas within the internal cavity of the expandable element 144 may be substantially zero.

Figure 7:
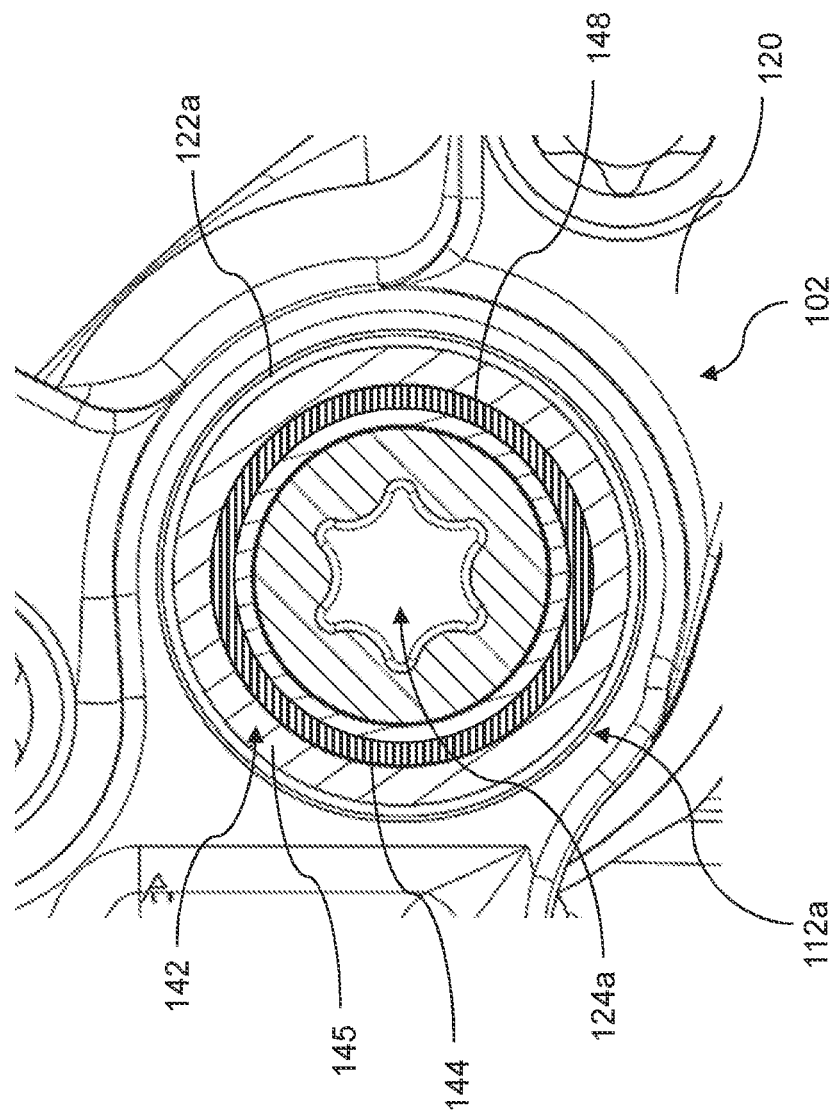
FIG. 7 is a partial cross-sectional view of the first guide assembly according to the first embodiment with the expandable element in an expanded configuration.
Figure 8:
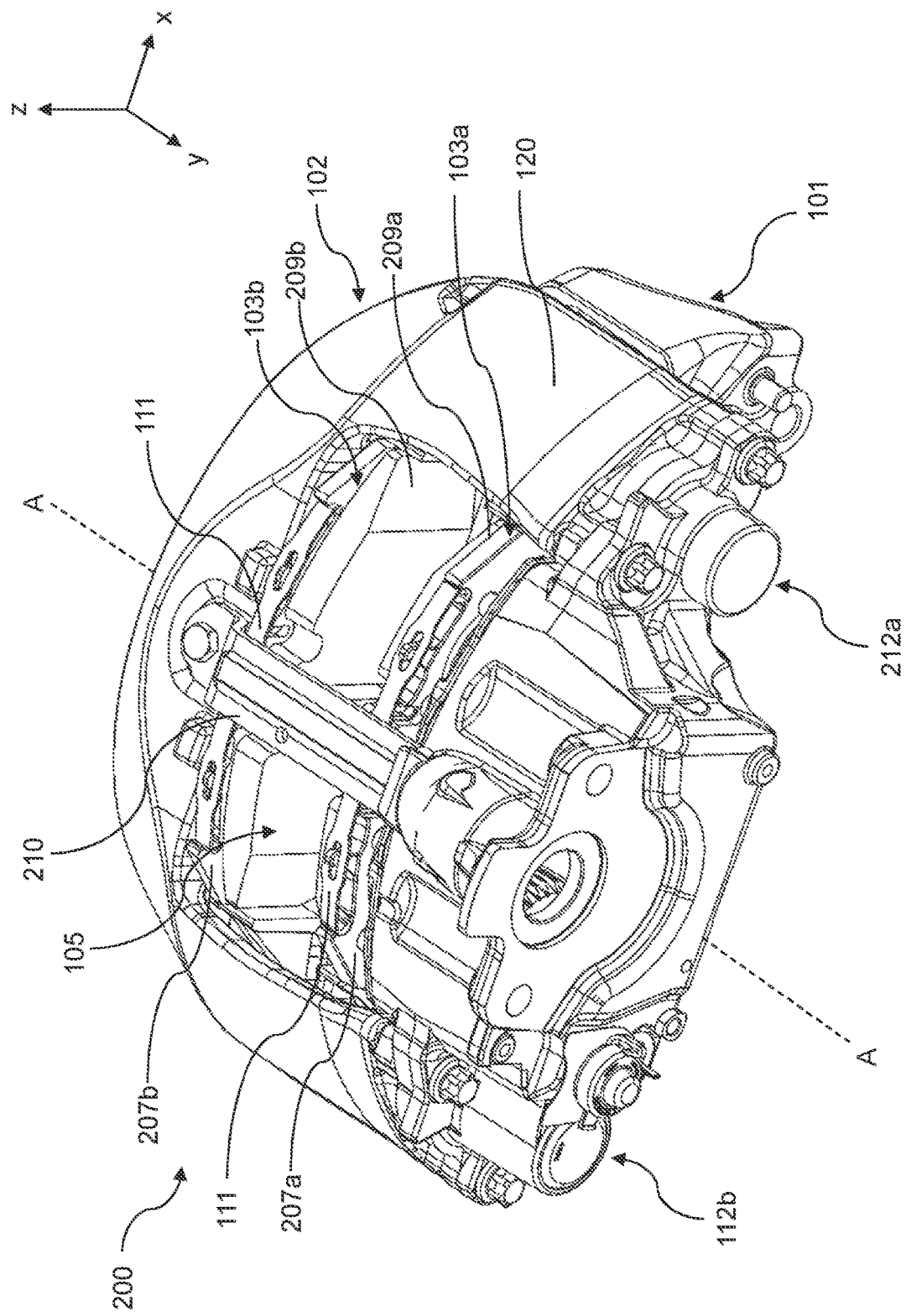
FIG. 8 is an upper isometric view of a brake assembly according to a second embodiment.
Figure 9:
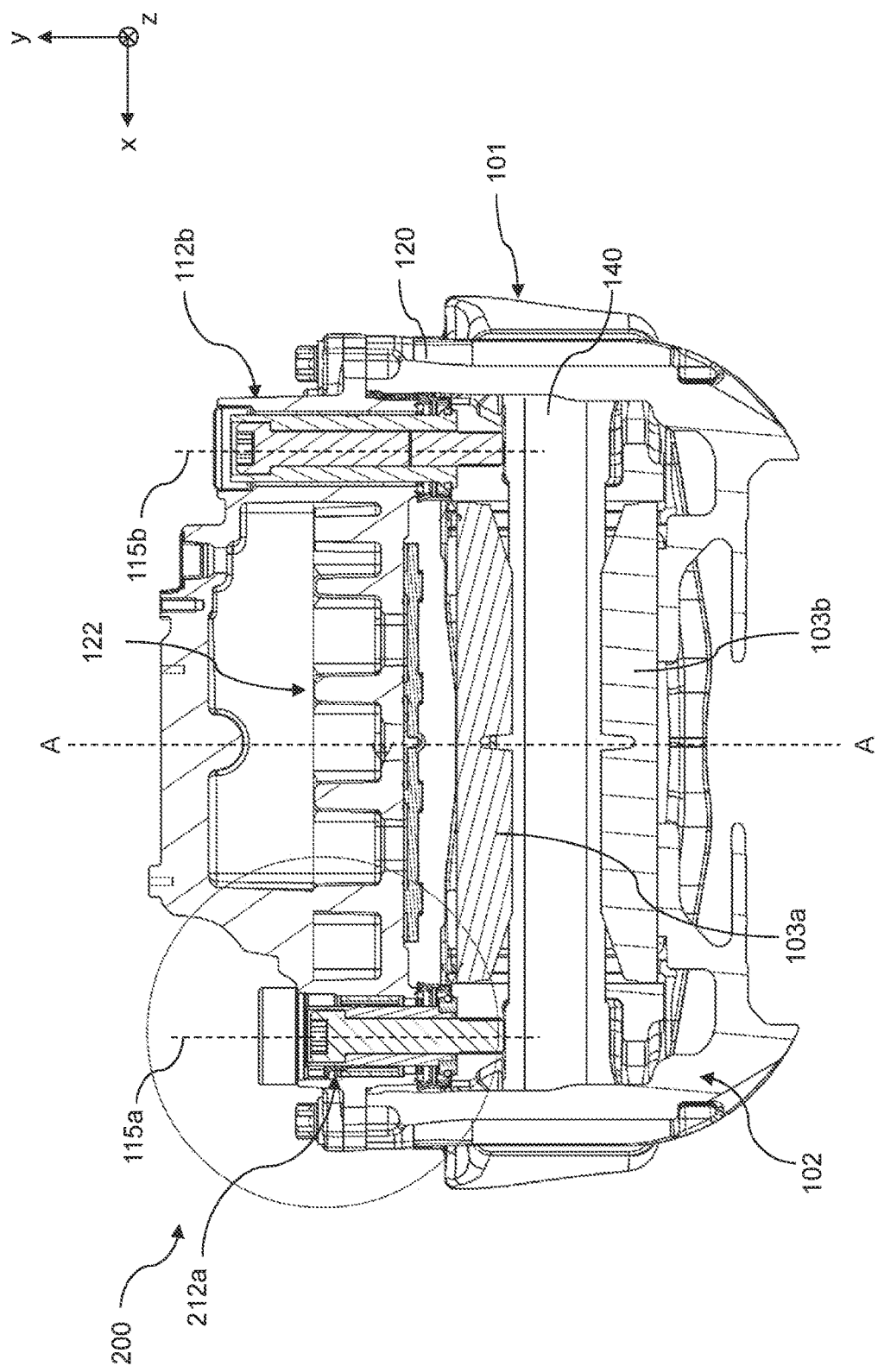
FIG. 9 is a cross-sectional view of the brake assembly of FIG. 8 in the x-y plane.

FIG. 7 shows the expandable element 144 in the expanded configuration. When the expandable element 144 is in the expanded configuration, the clearance between the expandable element 144 and the outer surface 148 of the guide pin 124a reduces to substantially zero. Moreover, in the expanded configuration, a sufficient volume of liquid and/or gas is introduced into the internal cavity of the expandable element 144 such that the internal pressure within the internal cavity is sufficient to ensure that the expandable element 144 contacts the outer surface 148 of the guide pin 124a. In the expanded configuration, this contact between the expandable element 144 and the outer surface 148 of the guide pin 124a, creates frictional forces sufficient to inhibit relative sliding between the guide pin 124a and the expandable element 144, and hence the caliper 102 and the brake carrier 101.

More specifically, by "inhibit relative sliding between the guide pin 124a and the expandable element 144", it is meant that the forces that need to be applied to the brake carrier 101 and/or the caliper 102 to overcome the frictional forces between the expandable element 144 and the outer surface 148 of the guide pin 124a are greater than the forces exerted on the brake carrier 101 and/or the caliper 102 during normal operation, for example during cornering maneuvers.

The surface of the expandable element 144 which contacts the guide pin 124a when the expandable element 144 is in the expanded configuration may be provided with a high-friction texture or coating. For example, said surface of the expandable element 144 may include an array of protrusions which effectively increase the contact surface area between the expandable element 144 and the guide pin 124a.

It will be appreciated that as the expandable element transforms from the contracted configuration to the expanded configuration by introducing liquid and/or gas into the expandable element 144, the friction between the expandable element 144 and the outer surface 148 of the guide pin 124a will increase. Likewise, as the expandable element transforms from the expanded configuration to the contracted configuration by removing liquid and/or gas from the expandable element 144, the friction between the expandable element 144 and the outer surface 148 of the guide pin 124a will decrease. As such, the friction between the expandable element 144 and the outer surface 148 of the guide pin 124a can be controlled by controlling the volume of liquid and/or gas within the expandable element 144.

In an intermediate configuration of the expandable element 144, a volume of liquid and/or gas may be introduced into the expandable element 144 which generates frictional forces between the guide pin 124a and the expandable element 144 that are not sufficient to inhibit relative sliding between the guide pin 124a and the expandable element 144. Advantageously, in the intermediate configuration, the expandable element 144 may help to dampen relative motion between the caliper 102 and the brake carrier 101.

It can be seen in FIG. 3 that the expandable element 144 extends along a majority of the axial length of the bore 122a. Advantageously, this helps to increase the friction between the lock arrangement 142 and the guide pin 124a in the expanded configuration by increasing the contact surface area between the expandable element 144 and the guide pin 124a. Moreover, it allows the lock arrangement 142 to operate over a greater relative range of movement between the caliper 102 and the brake carrier 101.

In alternative embodiments (not shown), the expandable element 144 may not be formed from an elastic material and thus may not stretch when expanded from the contracted configuration to the expanded configuration. In such embodiments, the capacity of the cavity in the expandable element 144 may be the same in both the expanded and contracted configurations. As such, in the contracted configuration, the expandable element 144 may be at least partially in frictional contact with the guide pin 124a. However, such frictional contact would be insufficient to inhibit relative sliding between the guide pin 124a and the expandable element 144.

In alternative embodiments (not shown), the expandable element 144 may extend along the entire axial length of the bore 122a. Alternatively, the expandable element may extend along half or less than half of the axial length of the bore 122a.

In alternative embodiments (not shown), the lock arrangement 142 may be secured to the guide pin 124a. In such embodiments, the bush 145 may be secured to the guide pin 124a and the expandable element 144 may be interposed between the bush 145 and the bore 122a. The lock arrangement 142 may be configured to increase the friction between the lock arrangement 142 and the bore 122a in the expanded configuration of the expandable element 144 relative to the contracted configuration.

In alternative embodiments (not shown), the expandable element 144 may not be in the form of a sleeve. In such embodiments, the expandable element 144 may contact only a portion of the guide pin 124a in the expanded configuration. For example, the expandable element 144 may have an arch-shaped profile along the axial direction, and may be configured to contact an arc of the outer surface 148 of the guide pin 124a in the expanded configuration.

FIGS. 8 to 13 show a disc brake assembly 200 for a heavy commercial vehicle according to a second embodiment. Features in common with the disc brake assembly 100 of FIGS. 1 to 7 share common reference numerals.

As shown in FIGS. 10 to 15, a lock arrangement 242 is located within the bore 122a. The lock arrangement 242 is operable to inhibit relative sliding between the caliper 102 and the brake carrier 101.

The lock arrangement 242 includes a moveable element 244 and a bush 245. The bush 245 is secured to the bore 122a such that the bush 245 is fixed relative to the bore 122a in a similar fashion to the bush 145 of the first embodiment. The moveable element 244 is at least partially interposed between the bore 122a and the guide pin 124a. Moreover, the moveable element 244 is at least partially interposed between the bush 245 and the guide pin 124a.

Figure 11:
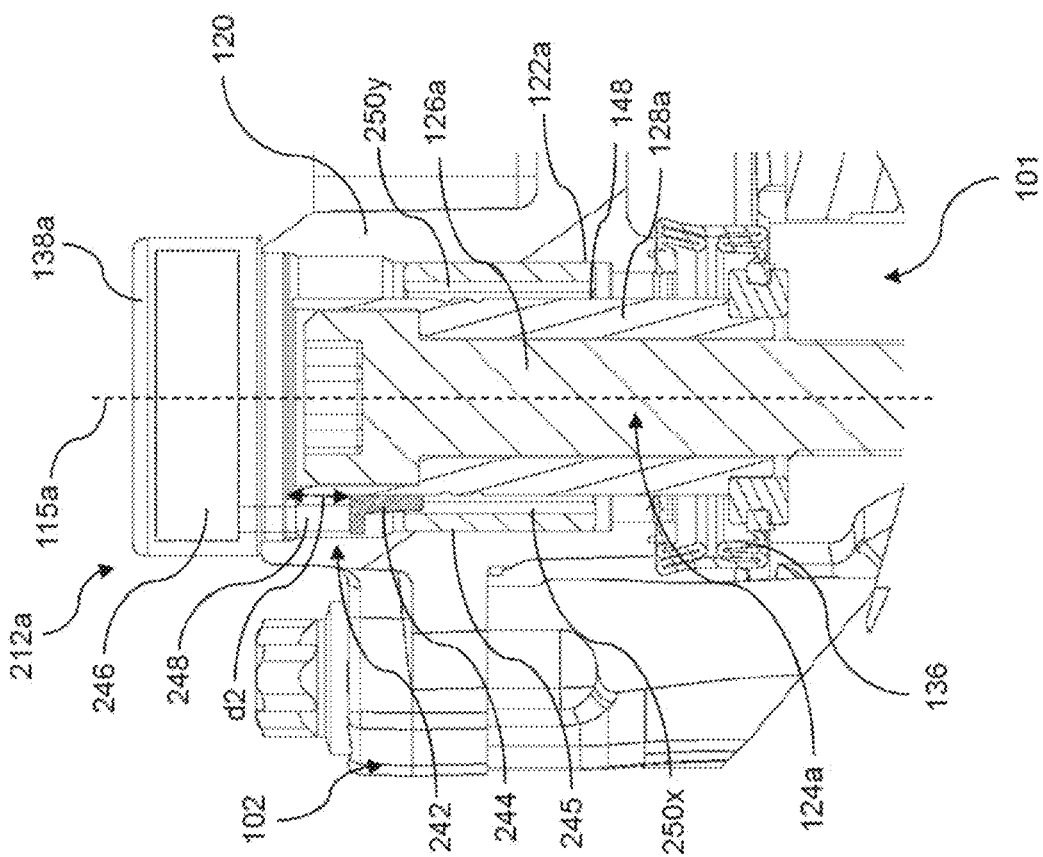
FIG. 11 is a magnified cross-sectional view of the first guide assembly according to the second embodiment with the moveable element in the second position.
Figure 10:
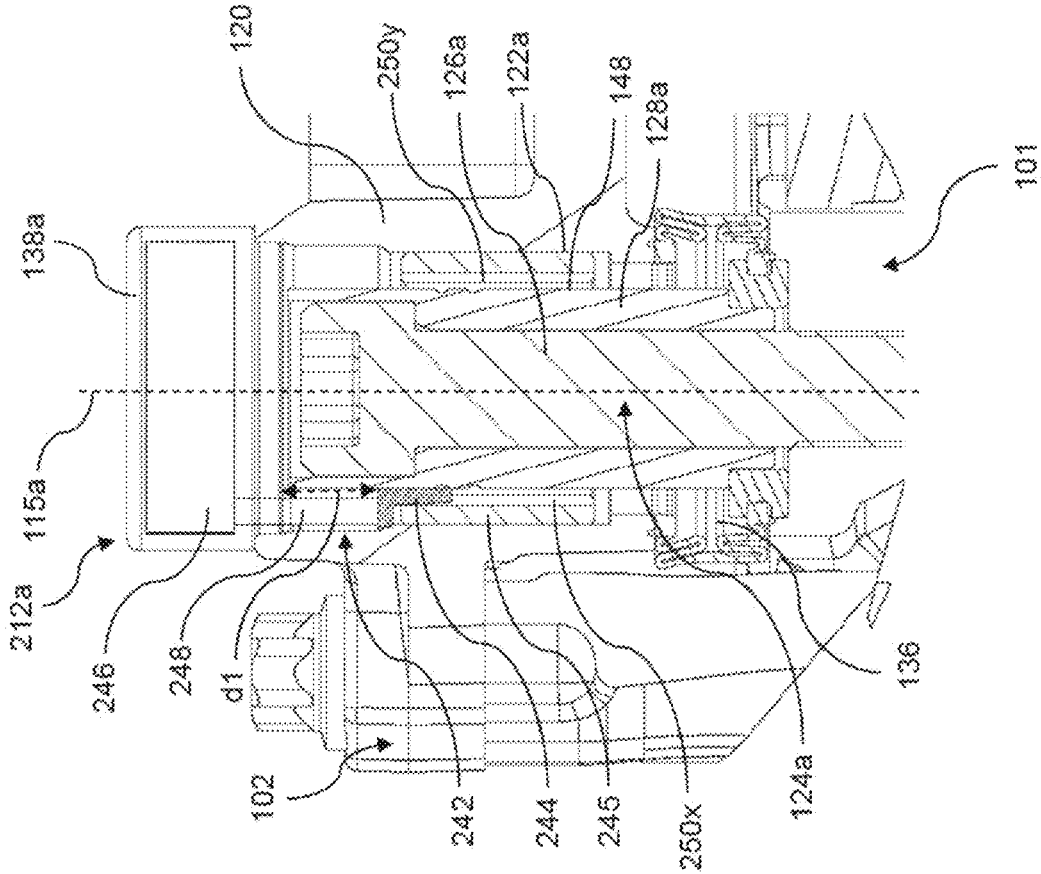
FIG. 10 is a magnified cross-sectional view of the first guide assembly according to the second embodiment with the moveable element in the first position.

The lock arrangement 242 includes an actuator 246, which is operable to move the moveable element 244 along an axis that is parallel to the axis 115a and the axis A-A, i.e., the axial direction. The actuator 246, which is shown schematically and in phantom in FIGS. 10 and 11, is secured to and housed within the cap 138a. The actuator 246 engages a rod 248, which the actuator 246 moves along the axial direction. The moveable element 244 is secured to a distal end of the rod 248. Hence, as the actuator 246 moves the rod 248 along the axial direction, the moveable element 244 moves along the axial direction.

In the illustrated embodiment, the actuator 246 is an electric linear actuator. However, in alternative embodiments (not shown), the actuator 246 may be a hydraulic or pneumatic-type actuator for example.

Since the cap 138a is secured to the caliper housing 120, and since the lock arrangement 242 is secured to the cap 138a, the lock arrangement 242 is fixed relative to the caliper 102.

The moveable element 244 is shown in greater detail in FIGS. 13a to 13c. FIG. 13a shows a side profile, FIG. 13b shows a front profile and FIG. 13c shows an isometric view of the moveable element 244.

The moveable element 244 has a rear surface 252, a front surface 254, a first side surface 256 and a second side surface 258.

The rear surface 252 is mounted to the distal end of the rod 248, and the front surface 254 is furthermost from the rod 248.

The first side surface 256 is planar and is arranged to contact the outer surface 148 of the guide pin 124a, as shown in FIGS. 10 and 11.

The second side surface 258 is curved and is arranged to contact the bush 245, as shown in FIGS. 10 and 11. In particular, the second side surface 258 has a substantially arch-shaped or semi-circular front profile as shown in FIG. 13b.

It is clear from FIG. 13a that the side profile of the second side surface 258 is inclined relative to the first side surface 256. This results in a maximum thickness between the second side surface 258 and the first side surface 256 reducing from a first thickness T1 proximate the rear surface 252, to a second thickness T2 at the front surface 254. The first thickness T1 is greater than the second thickness T2. As such, the moveable element 244 has a substantially wedge-shaped side profile.

In the illustrated embodiment, the moveable element 244 is made from a metallic material, such as steel. However, in alternative embodiments (mot shown), the moveable element 244 may be made from any suitable material, such as a ceramic or plastics material for example.

Figure 12:
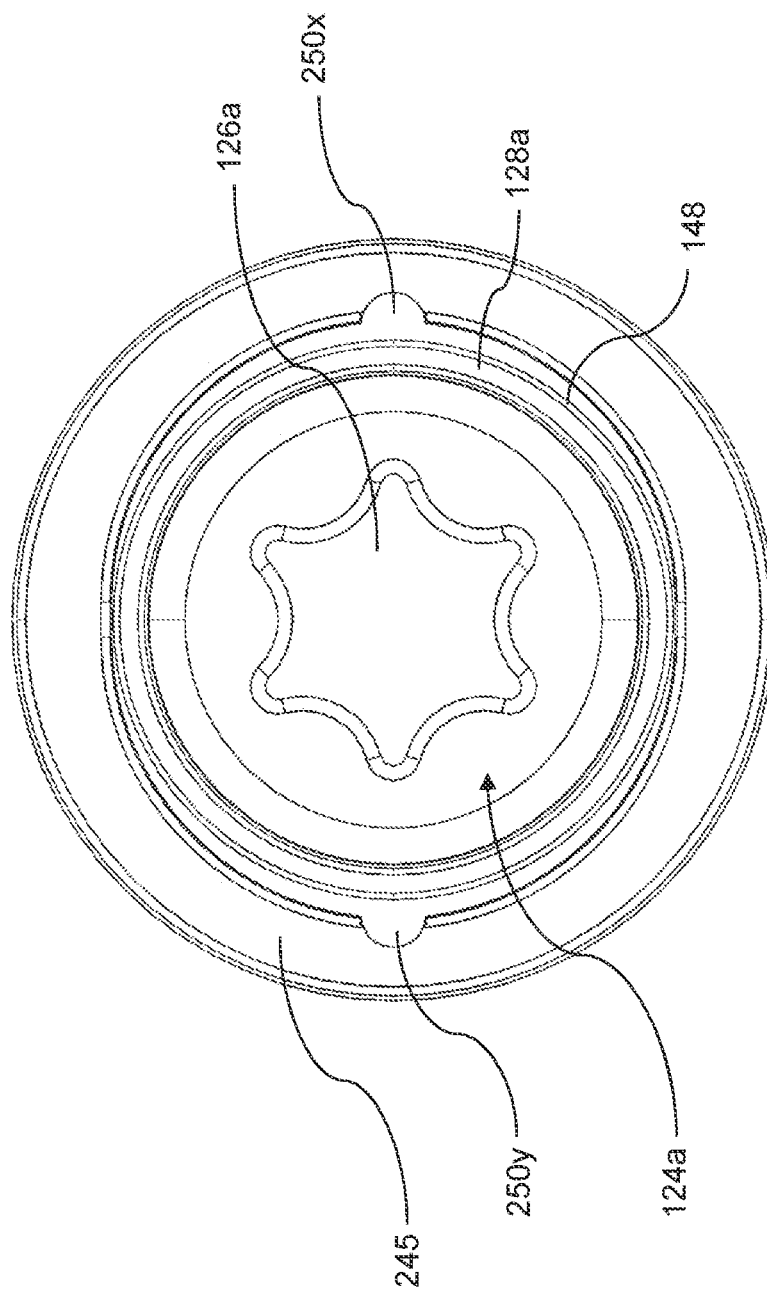
FIG. 12 is an end view of the bush and the guide pin of the second embodiment.
Figure 14:
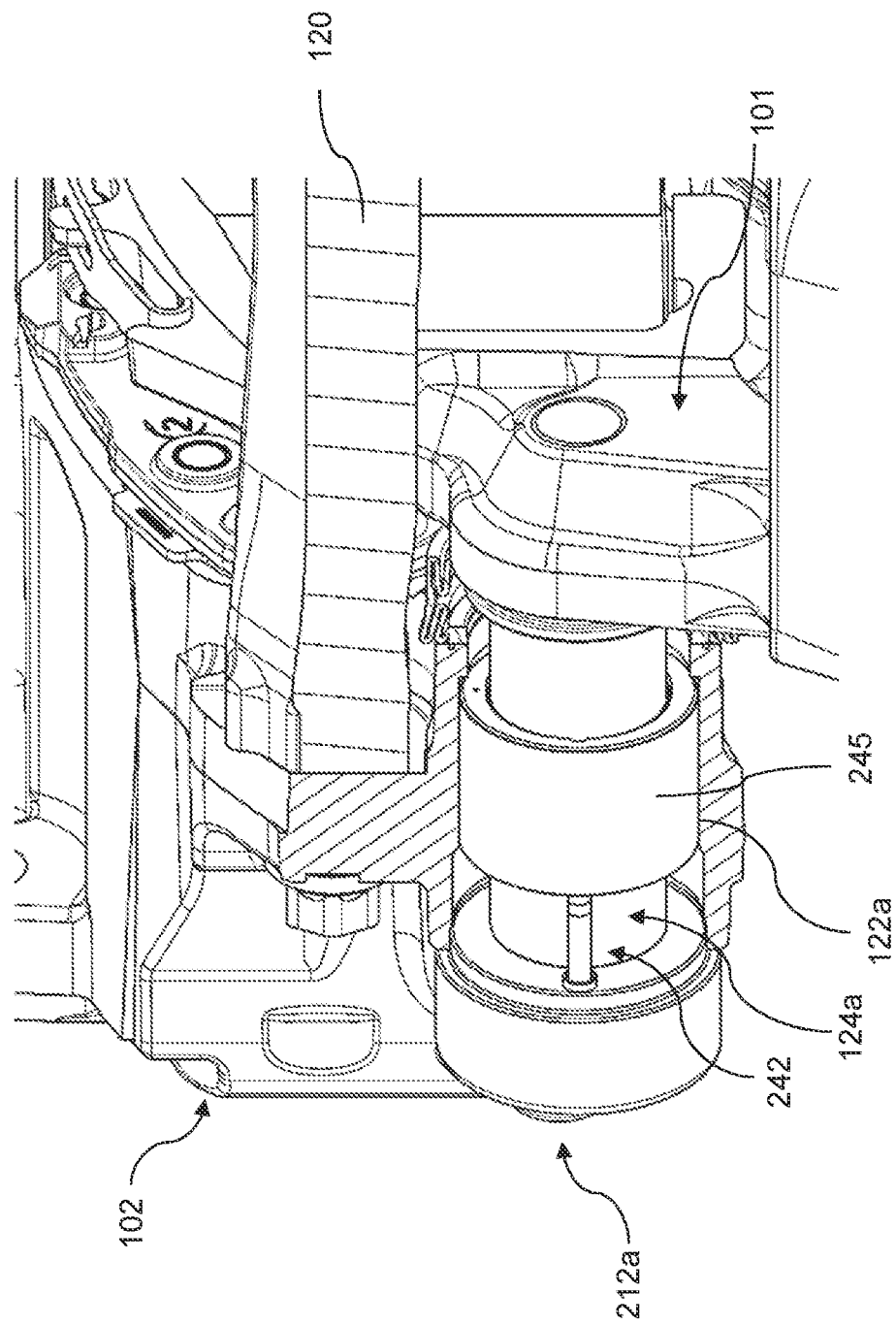
FIG. 14 is a rear isometric view of the brake assembly of FIG. 8 with a portion of the caliper removed to show the first guide assembly.
Figure 15:
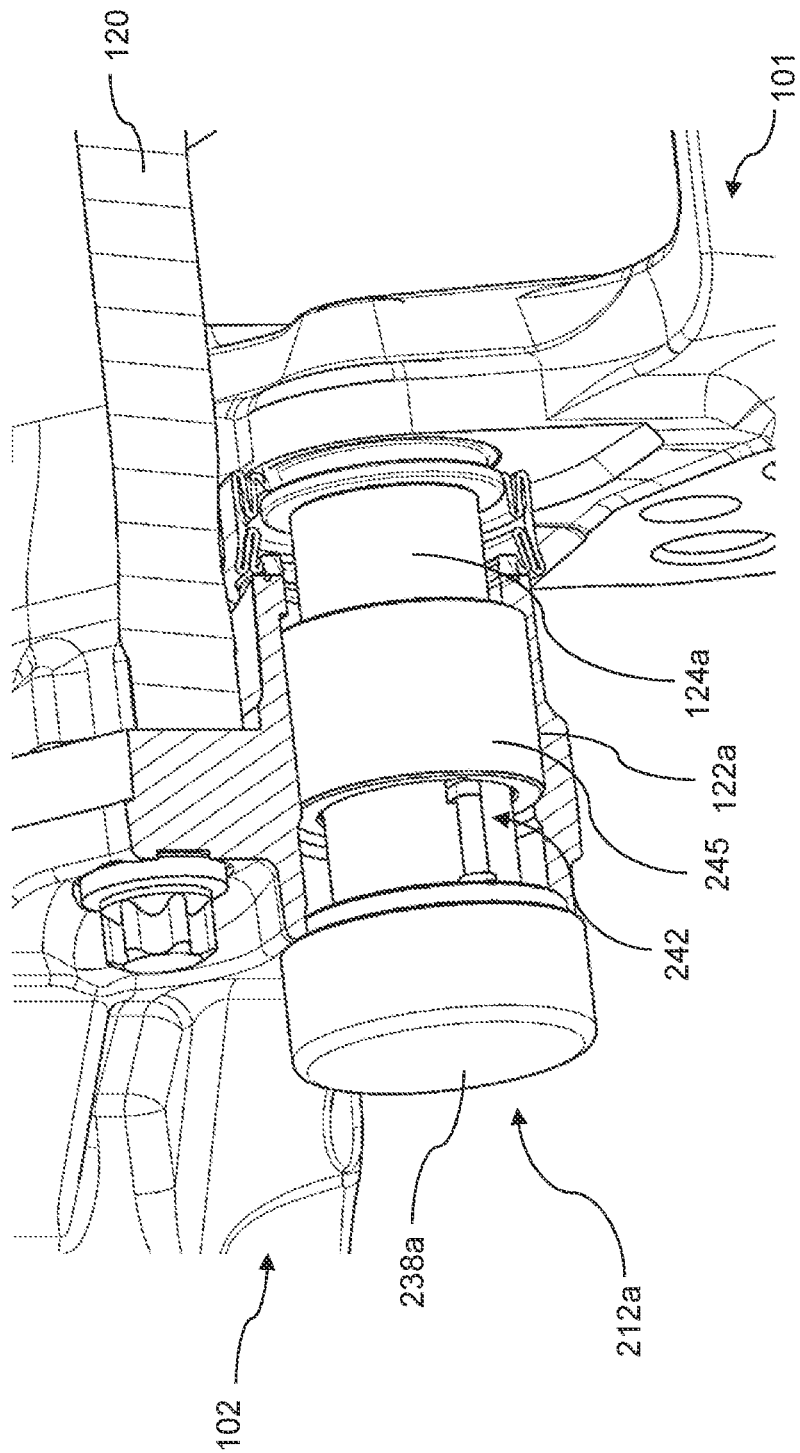
FIG. 15 is a front isometric view of the brake assembly of FIG. 8 with a portion of the caliper removed to show the first guide assembly.

FIG. 12 shows the profile of the guide pin 124a and the bush 245 exclusively. It can be seen in FIG. 12 that the guide pin 124a has a circular outer profile and the bush 245 has an elliptical inner profile. The minimum diameter of the elliptical inner profile of the bush 245, which is vertically aligned in FIG. 12, substantially corresponds to the diameter of the outer profile of the guide pin 124a.

The bush 245 has a circular outer profile to correspond to the circular profile of the bore 122a to which it is secured.

The bush 245 includes a first channel 250x and a second channel 250y. The two channels 250x, 250y are located on opposite sides of the inner profile of the bush 245. In particular, the channels 250x, 250y are located along the maximum diameter of the inner profile of the bush 245. In FIG. 12, the maximum diameter of the bush 245 is horizontally aligned.

The first channel 250x is arranged such that the moveable element 244 is at least partially received with said first channel 250x. In the illustrated embodiment, no components are received with the second channel 250y.

It can be seen by comparing FIGS. 12 and 13b that the first channel 250x has a profile which corresponds substantially to the front profile of the second side surface 258 of the moveable element 244; i.e., both the first channel 250x and the second side surface 258 have an arch-shaped or semi-circular profile. Unlike the moveable element 244, the bush 245 has a constant cross-sectional profile along the axial direction.

In the illustrated embodiment, the bush 245 is formed from a bronze material. However, in alternative embodiments (not shown), the bush 245 may be formed from any suitable material, such as another suitable metallic material, for example steel, a ceramics material, or a plastics material.

The actuator 246 is operable to move the moveable element 244 along the axial direction between a first position, which is shown in FIG. 10, and a second position, which is shown in FIG. 11.

In the first position, the rear surface 252 of the moveable element 244 is located a first distance d1 away from the outboard end of the cap 138a. In the second position, the rear surface 252 of the moveable element 244 is located a second distance d2 away from the outboard end of the cap 138a. The first distance d1 is greater than the second distance d2.

In the first position, the planar first side surface 256 of the moveable element 244 is in contact with outer surface 148 of the guide pin 124a, and the curved second side surface 258 of the moveable element 244 is partially in contact with the bush 245.

In the first position, the friction between the planar first side surface 256 of the moveable element 244 and the guide pin 124a is sufficient to inhibit relative sliding between the moveable element 244 and the guide pin 124a, and hence between the caliper 102 and the brake carrier 101. The sufficient friction is achieved via the bush 245 forcing the moveable element 244 against the guide pin 124a due to the thickness of the portion of the moveable element 244 which is in contact with both the bush 245 and the guide pin 124a.

The moveable element 244 includes a stop surface 260 (see FIGS. 13a-13c) arranged to abut against an inboard end of the bush 245 to prevent the moveable element 244 from being moved further away from the outboard end of the cap 138a. As shown in FIG. 10, the moveable element 244 may be moved via the actuator 246 even further away from the outboard end of the cover 138a than the first position since the stop surface 260 is spaced from the inboard end of the bush 245.

As shown in FIG. 11, in the second position, the planar first side surface 256 of the moveable element 244 is in contact with outer surface 148 of the guide pin 124a. Unlike the first position, the curved second side surface 258 of the moveable element 244 is not in contact with the bush 245 in the second position. This is because, in the second position, the portion of the moveable element 244 that is received within the first channel 250x has a maximum thickness that is smaller than the radial width of the first channel 250x. As such, the curved second side surface 258 is spaced from the bush 245. Note that the radial width of the first channel 250x is the width of the first channel 250x as measured perpendicular to the axial direction.

Since the bush 245 is not in contact with the moveable element 244 in the second position, the bush does not force the moveable element 244 against the outer surface 148 of the guide pin 124a. As such, in the second position, the friction between the planar first side surface 256 of the moveable element 244 and the guide pin 124a is insufficient to inhibit relative sliding between the moveable element 244 and the guide pin 124a. Hence, the moveable element 244 and the guide pin 124a, and thus the caliper 102 and the brake carrier 101, are free to slide relative to each other.

As the actuator 246 moves the moveable element 244 along the axial direction from the second position towards the first position, the maximum thickness of the portion of the moveable element 244 that is received within the first channel 250x of the bush 245 (hereinafter referred to as the "received portion") increases. When the moveable element 244 is positioned a certain distance from the inboard end of the guide pin 124a, the maximum thickness of the received portion of the moveable element 244 is identical to the radial width of the first channel 250x. As such, the received portion of the moveable element 244 contacts the bush 245.

As the actuator 246 moves the moveable element 244 further along the axial direction towards the first position, the maximum thickness of the received portion of the moveable element 244 increases further. As such, the received portion of the moveable element 244 applies an increasing radial force to the bush 245 and an increasing radial force to the guide pin 124*a*. Hence, the frictional forces between the received portion of the moveable element 244 and the guide pin 124*a* increases.

The guide pin 124*a* and the moveable element 244 may still be free to slide relative to each other as the moveable element moves from the position in which the received portion of the moveable element 244 first contacts the bush 245 towards the first position. This is because the friction between the moveable element 244 and the guide pin 124*a*, although potentially significant, may be insufficient to inhibit relative sliding between the guide pin 124*a* and the moveable element 244. It may be that the friction between the moveable element 244 and the guide pin 124*a* is only sufficient to inhibit relative sliding between the guide pin 124*a* and the moveable element 244 once the moveable element 244 has reached the first position.

In alternative embodiments (not shown), the lock arrangement 242 may include a second moveable element at least partially interposed between the bore 122*a* and the guide pin 124*a*, where the second moveable element is spaced from the first moveable element 244. The actuator 246 or an additional actuator may be operable to move the second moveable element between a first position and a second position along the axial direction in a similar manner as the first moveable element 244. The second moveable element may be received within the second channel 250*y* of the bush 245.

In alternative embodiments (not shown), the lock arrangement 242 may include a plurality of moveable elements 244 arranged around the circumference of the guide pin 124*a*. For example, the lock arrangement 242 may include two or more, three or more, four or more five or more, or six or more moveable elements 244 arranged around the circumference of the guide pin 124*a* in a spaced-apart manner. The actuator 246 or one or more additional actuators may be operable to move the moveable elements 244 between a first position and a second position along the axial direction in a similar manner as previously described. The moveable elements 244 may be connected together to form a ring such that adjacent moveable elements 244 are secured to each other. Said ring may then be moveable between the first position and the second position under the action of a single actuator.

In alternative embodiments (not shown), the lock arrangement 242 may be secured to the guide pin 124*a*. In such embodiments, the actuator 246 may be secured to the inboard end of the guide pin 124*a*, the bush 245 may be secured to the outer surface 148 of the guide pin 124*a*, and the moveable element 244 may be interposed between the bush 245 and the bore 122*a*. In such embodiments, the bush 245 may be modified such that the channel 250*x* is formed on a surface of the bush 245 facing the bore 122*a*. The lock arrangement 242 may be operable to increase the friction between the moveable element 244 and the bore 122*a* or a bush which is secured to the bore 122*a* in order to inhibit relative sliding between the caliper 102 and the brake carrier 101.

In alternative embodiments (not shown), the lock arrangement 242 may not include the bush 245. In such embodiments, the moveable element 244 may contact the guide bore 122*a* and the outer surface 148 of the guide pin 124*a* in the first position.

Similar to the first guide assembly 112*a*, the second guide assembly 112*b* comprises a bore extending through the caliper housing 120 along an axis 115*b*, which is parallel to axis 115*a* and axis A-A, and a guide pin.

In alternative embodiments (not shown), the second guide assembly 112*b* may also include the lock arrangement 142, 242. For example, in some embodiments, the first guide assembly 112*a* and the second guide assembly 112*b* may both include the lock arrangement 142 of the first embodiment or the lock arrangement 242 of the second embodiment. Alternatively, in other embodiments, the first guide assembly 112*a* may include either the lock arrangement 142 of the first embodiment or the lock arrangement 242 of the second embodiment, and the second guide assembly 112*b* may include the other of the lock arrangement 142 of the first embodiment or the lock arrangement 242 of the second embodiment.

Operation of the disc brake assembly 100, 200 and, specifically of the lock arrangement 142, 242 will now be described.

During a braking operation, the lock arrangement 142, 242 is in a configuration which does not inhibit the caliper 102 and the brake carrier 101 from sliding freely relative to each other; i.e., the lock arrangement 142 of the first embodiment is in the contracted configuration, and the moveable element 244 of the lock arrangement 242 of the second embodiment is in the second position.

During the braking operation, as the actuation mechanism 122 moves the inboard brake pad 103*a* towards the rotor 140, the friction material 209*a* of the inboard brake pad 103*a* contacts the rotor 140. As the friction material 209*a* of the inboard brake pad 103*a* contacts the rotor 140, the inboard brake pad 103*a* will no longer advance. Instead, a reaction force passes through the inboard brake pad 103*a* and is transmitted to the caliper 102, causing the caliper 102 to slide relative to the brake carrier 101 in the inboard axial direction. The outboard brake pad 103*b* is engaged by the caliper 102, causing the outboard brake pad 103*b* to be moved in the direction of the rotor 140, and the friction material 209*b* of the outboard brake pad 103*b* to come into contact with the rotor 140, further restricting its rotation and slowing the vehicle.

After a braking operation, it is desired that the inboard brake pad 103*a* and the outboard brake pad 103*b* are moved away from the rotor 140 completely, as any contact of the friction material 209*a* of the inboard brake pad 103*a* or the friction material 209*b* of the outboard brake pad 103*b* with the rotor 140 will cause drag, leading to inefficiency of the vehicle due to the frictional forces that must be overcome to accelerate as well as premature wearing of the brake pads 103*a*, 103*b* and rotor 140, which must then be replaced earlier than otherwise necessary.

When the disc brake assembly 100 is no longer being actuated, the inboard brake pad 103*a* and the outboard brake pad 103*b* typically move away from the rotor 140 due to the uneven surface of the rotor 140 and low resistance of the first guide assembly 112*a* and second guide assembly 112*b* to sliding of the caliper 102, meaning only a small axial force is needed in order for the caliper 102 to slide relative to the brake carrier 101 in the opposite axial direction as during a braking operation.

The disc brake assembly 100 may include a positive pad retraction system (not shown), such as one or more positive pad retraction springs of a type known in the art interposed between the inboard brake pad 103*a* and the outboard brake pad 103*b*. Such positive pad retraction systems help ensure that the outboard brake pad assembly 103*b* is moved away from the rotor 140 after a braking operation.

When the braking operation has ended and when the inboard brake pad 103*a* and the outboard brake pad 103*b* are spaced from the rotor 140, the lock arrangement 142, 242 is operated to inhibit relative sliding between the caliper 102 and the carrier 101; i.e., the lock arrangement 142 of the first embodiment is transformed to the expanded configuration, and the moveable element 244 of the lock arrangement 242 of the second embodiment is moved to the first position. As such, the positions of the inboard brake pad 103a and the outboard brake pad 103b remain substantially fixed relative to the rotor 140 regardless of the forces exerted on the brake pads 103a, 103b during normal operation of the vehicle. Hence, outside of a braking operation, the brake pads 103a, 103b are inhibited from contacting the rotor 140.

Preferably, the lock arrangement 142, 242 is operated to inhibit relative sliding between the caliper 102 and the carrier 101 only once the inboard brake pad 103a and the outboard brake pad 103b are located equidistant from the rotor 140. This helps to ensure that the brake pads 103a, 103b wear evenly over the lifetime of the brake pads 103a, 103b.

When a subsequent braking operation is initiated, the lock arrangement 142, 242 is operated to allow the caliper 102 and the carrier 101 to slide freely relative to each other; i.e., the lock arrangement 142 of the first embodiment is transformed to the contracted configuration, and the moveable element 244 of the lock arrangement 242 of the second embodiment is moved to the second position.

In the lock arrangement 242, the actuator 246 is self-locking. By self-locking it is meant that the actuating actuator 246 can maintain the position of the rod 248 relative to the cap 138a without requiring electrical power. As such, when the actuator 246 is operated to move the moveable element 244 along the axial direction from the second position to the first position, the actuator 246 does not require electrical power to maintain the moveable element 244 in the first position.

In the event that the moveable element 244 is in the first position and the actuator 246 does not have a power supply, the disc brake assembly 200 is still able to perform a braking operation. This is because the frictional forces between the moveable element 244 and the guide pin 124a are less than the force applied by the actuation mechanism 122 to the inboard brake pad 103a during a braking operation. As such, the force applied by the actuation mechanism 122 to the inboard brake pad 103a is sufficient to overcome the frictional forces between the moveable element 244 and the guide pin 124a, and move the caliper 102 relative to the brake carrier along the axial direction.

In alternative embodiments (not shown), the lock arrangement may include a member formed from an electroactive polymer (EAP) which is at least partially interposed between the bore 122a and the guide pin 124a. As will be understood, EAPs are polymers that exhibit a change in size or shape when stimulated by an electric field. In such embodiments, the size and/or shape of the member may be altered via suitable stimulation by an electric field to increase the friction between said member and the bore 122a or the guide pin 124a such that relative sliding between the carrier 101 and the caliper 102 is inhibited.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake assembly comprising:
a caliper comprising a first guide bore;
a brake carrier arranged to receive a brake pad;
a first guide pin secured to the brake carrier, the first guide pin being received within the first guide bore of the caliper such that the caliper is slidable relative to the brake carrier, wherein the first guide pin comprises a guide sleeve that comprises a central bore, and a fastener that is disposed in the central bore and holds the guide sleeve in place on the brake carrier; and
a first lock arrangement at least partially located within the first guide bore, wherein the first lock arrangement is operable to selectively inhibit relative sliding between the caliper and the brake carrier, the first lock arrangement comprising:
a bush that is received in the first guide bore, is secured to the caliper, and comprises an inner side that faces toward the guide sleeve and a channel that extends away from the inner side of the bush; and
a moveable element that is disposed in the channel between the bush and the guide sleeve.

2. The brake assembly of claim 1 wherein the first lock arrangement is configured to be at least partially interposed between the first guide bore and the first guide pin.

3. The brake assembly of claim 2 wherein the first lock arrangement is secured to either the caliper or the first guide pin, and wherein the first lock arrangement is configured to increase a frictional force between the first lock arrangement and the other of the caliper or the first guide pin in a first state of the first lock arrangement relative to a second state of the first lock arrangement, wherein in the first state, the first lock arrangement inhibits relative sliding between the caliper and the brake carrier, and wherein in the second state, the caliper and the brake carrier are free to slide relative to each other.

4. The brake assembly of claim 3 wherein the first lock arrangement comprises a first moveable element at least partially interposed between the first guide bore and the first guide pin, wherein the first lock arrangement is configured to move the first moveable element between a first position and a second position along an axis substantially parallel to a longitudinal axis of the first guide pin, wherein in the first state, the first moveable element is in the first position, and wherein in the second state, the first moveable element is in the second position.

5. The brake assembly of claim 4 wherein the first moveable element has a substantially wedge-shaped profile.

6. The brake assembly of claim 4 wherein the caliper comprises a cap arranged to close an opening of the first guide bore, and wherein the first lock arrangement comprises an actuator secured to the cap which is operable to move the first moveable element relative to the caliper between the first position and the second position.

7. The brake assembly of claim 6 wherein the actuator is an electric linear actuator.

8. The brake assembly of claim 4 wherein the bush is interposed between the first guide bore and the first guide pin, and the first moveable element at least partially interposed between the bush and the first guide pin.

9. The brake assembly of claim 8 wherein the first moveable element is at least partially received within the channel.

10. The brake assembly of claim 9 wherein the channel has a profile which corresponds substantially to a profile of the first moveable element.

11. The brake assembly of claim 4 wherein the first lock arrangement comprises a second moveable element at least partially interposed between the first guide bore and the first guide pin, the second moveable element spaced from the first moveable element, wherein the first lock arrangement is configured to move the second moveable element between a first position and a second position along a second axis substantially parallel to the longitudinal axis of the first guide pin, wherein in the first state, the second moveable element is in the first position, and wherein in the second state, the second moveable element is in the second position.

12. The brake assembly of claim 1 further comprising a second guide pin secured to the brake carrier, wherein the caliper comprises a second guide bore, the second guide pin being received within the second guide bore of the caliper, wherein the brake assembly further comprises a second lock arrangement at least partially located within the second guide bore, wherein the second lock arrangement is operable to inhibit relative sliding between the caliper and the brake carrier.

* * * * *